(12) United States Patent
Khoun et al.

(10) Patent No.: US 11,493,205 B2
(45) Date of Patent: Nov. 8, 2022

(54) PREFERENTIAL FLOW DISTRIBUTION FOR GAS TURBINE ENGINE COMPONENT

(71) Applicant: RAYTHEON TECHNOLOGIES CORPORATION, Farmington, CT (US)

(72) Inventors: Laengheng Khoun, Hartford, CT (US); Edward F. Pietraszkiewicz, Southington, CT (US); Joshua E. Kinnaman, Cheshire, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/460,520

(22) Filed: Aug. 30, 2021

(65) Prior Publication Data

US 2021/0388988 A1 Dec. 16, 2021

Related U.S. Application Data

(62) Division of application No. 16/214,824, filed on Dec. 10, 2018, now Pat. No. 11,125,434.

(51) Int. Cl.
*F23R 3/00* (2006.01)
*F23R 3/06* (2006.01)
*F23R 3/60* (2006.01)

(52) U.S. Cl.
CPC .............. *F23R 3/002* (2013.01); *F23R 3/06* (2013.01); *F23R 3/60* (2013.01); *F23R 2900/03044* (2013.01)

(58) Field of Classification Search
CPC .... F23R 3/002; F23R 3/06; F23R 3/16; F23R 3/26; F23R 3/50; F23R 2900/03044; F28F 2215/04; F28F 3/022; F28F 13/02; F28F 13/06; F28F 13/14; F28D 2021/0028; F28D 2021/0029; H01L 23/473
See application file for complete search history.

(56) References Cited

U.S. PATENT DOCUMENTS 8,024,933 B2 9/2011 Woolford et al.
8,650,882 B2 2/2014 Woolford et al.
(Continued)

FOREIGN PATENT DOCUMENTS

EP 2532962 12/2012
WO 2016099662 6/2016

OTHER PUBLICATIONS

European Search Report for European Patent Application No. 19215043.1 completed Mar. 12, 2020.

*Primary Examiner* — Todd E Manahan
*Assistant Examiner* — Rodolphe Andre Chabreyrie
(74) *Attorney, Agent, or Firm* — Carlson, Gaskey & Olds, P.C.

(57) ABSTRACT

A combustor liner for a gas turbine engine includes at least one liner segment that has an external wall dimensioned to bound a combustion chamber. The external wall extends between leading and trailing edges in an axial direction and extends between opposed mate faces in a circumferential direction. A cooling circuit is defined by the external wall. A plurality of heat transfer features are distributed in the cooling circuit to define first and second prioritized flow regions on opposed sides of a first restricted flow region.

11 Claims, 8 Drawing Sheets

(56) References Cited

U.S. PATENT DOCUMENTS

| | | | |
|---|---|---|---|
| 2007/0193216 A1* | 8/2007 | Woolford | F28F 3/022 |
| | | | 52/782.1 |
| 2013/0055722 A1 | 3/2013 | Verhiel et al. | |
| 2016/0025342 A1* | 1/2016 | Erbas-Sen | F02C 7/18 |
| | | | 415/178 |
| 2016/0169512 A1* | 6/2016 | Tu | F23R 3/06 |
| | | | 60/754 |
| 2016/0201559 A1* | 7/2016 | Hase | F02C 7/18 |
| | | | 60/755 |
| 2017/0089581 A1 | 3/2017 | Lao et al. | |

* cited by examiner

PREFERENTIAL FLOW DISTRIBUTION FOR GAS TURBINE ENGINE COMPONENT

CROSS-REFERENCE TO RELATED APPLICATIONS

This application is a divisional of U.S. patent application Ser. No. 16/214,824, filed Dec. 10, 2018, incorporated herein by reference.

BACKGROUND

This disclosure relates to a combustor for a gas turbine engine and, more particularly, to flow distribution through a combustor liner of the combustor.

Gas turbine engines can include a fan for propulsion air and to cool components. The fan also delivers air into a core engine where it is compressed. The compressed air is then delivered into a combustor section.

The combustor section includes one or more combustor liners that define a combustion chamber. Fuel is ejected from fuel injectors into the combustion chamber. The compressed air is mixed with the fuel and ignited in the combustion chamber to produce relatively hot combustion gases. The combustion gases expand downstream over and drive turbine blades.

The combustor liners are subject to extreme heat due to the combustion process. Formation of hot spots can occur along localized regions of the combustor liners. Cooling flow may be utilized to cool portions of the combustor liners at locations adjacent to the hot spots.

SUMMARY

A combustor liner for a gas turbine engine according to an example of the present disclosure includes at least one liner segment that has an external wall dimensioned to bound a combustion chamber. The external wall extends between leading and trailing edges in an axial direction and extends between opposed mate faces in a circumferential direction. A cooling circuit is defined by the external wall. A plurality of heat transfer features are distributed in the cooling circuit to define a first restricted flow region that tapers from the leading edge to the trailing edge and to define at least one prioritized flow region that extends substantially from the leading edge to the trailing edge such that the at least one prioritized flow region is bounded by a perimeter of the first restricted flow region, and the at least one prioritized flow region has a lesser concentration of the plurality of heat transfer features than the first restricted flow region.

In a further embodiment of any of the foregoing embodiments, the at least one prioritized flow region includes first and second prioritized flow regions on opposed sides of the first restricted flow region.

In a further embodiment of any of the foregoing embodiments, the plurality of heat transfer features are distributed in the cooling circuit to define second and third restricted flow regions that extend substantially along the mate faces to bound respective ones of the first and second prioritized flow regions.

In a further embodiment of any of the foregoing embodiments, each of the first and second prioritized flow regions has a substantially trapezoidal geometry.

In a further embodiment of any of the foregoing embodiments, the at least one liner segment includes a first liner segment and a second liner segment arranged in the axial direction to define a stepwise change in area of the combustion chamber such that the cooling circuit of the first liner segment is oriented to eject cooling flow from the trailing edge of the first liner segment onto external surfaces of the external wall of the second liner segment that defines the combustion chamber.

In a further embodiment of any of the foregoing embodiments, the at least one liner segment includes an array of liner segments, and each of the mate faces defines an intersegment gap with an adjacent one of the liner segments.

In a further embodiment of any of the foregoing embodiments, the plurality of heat transfer features includes a plurality of pedestals that extend in a radial direction between opposed internal surfaces defining the cooling circuit.

In a further embodiment of any of the foregoing embodiments, respective sets of the plurality of heat transfer features are uniformly distributed in the first restricted flow region and in the at least one prioritized flow region.

A further embodiment of any of the foregoing embodiments includes a thermal barrier coating disposed on surfaces of the external wall defining the combustion chamber.

In a further embodiment of any of the foregoing embodiments, the surfaces of the external wall defining the combustion chamber are substantially free of any cooling apertures along the cooling circuit.

In a further embodiment of any of the foregoing embodiments, the external wall is a bulkhead that bounds the combustion chamber in the axial direction. The bulkhead has at least one aperture along the combustion chamber that is dimensioned to receive a fuel injector nozzle.

A combustor section for a gas turbine engine according to an example of the present disclosure includes an array of fuel injector nozzles arranged about a longitudinal axis. A combustor liner includes an array of liner segments arranged about the longitudinal axis to define a combustion chamber. Each one of the fuel injector nozzles defines a nozzle axis. A projection of the nozzle axis extends through the combustion chamber. Each one of the liner segments includes an external wall extending axially between leading and trailing edges and extending circumferentially between opposed mate faces with respect to the longitudinal axis. A cooling circuit is defined by the external wall. A plurality of heat transfer features are distributed in the cooling circuit to define first and second prioritized flow regions on opposed sides of a first restricted flow region. Each of the first and second prioritized flow regions extend axially along the projection of the nozzle axis of respective ones of the fuel injector nozzles from the leading edge to the trailing edge such that the first restricted flow region tapers from the leading edge to the trailing edge, and each of the first and second prioritized flow regions have a relatively greater average flow path volume than the first restricted flow region.

In a further embodiment of any of the foregoing embodiments, the plurality of heat transfer features are distributed in the cooling circuit to define second and third restricted flow regions that extend substantially along the mate faces to bound a perimeter of respective ones of the first and second prioritized flow regions, and each of the first and second prioritized flow regions has a relatively greater average flow path volume than the second and third restricted flow regions.

In a further embodiment of any of the foregoing embodiments, surfaces of the external wall defining the combustion chamber are substantially free of any cooling apertures along the cooling circuit.

A gas turbine engine according to an example of the present disclosure includes a compressor section, a turbine section that drives the compressor section, a combustor section has a combustor. The combustor has a combustor liner and an array of fuel injector nozzles arranged about an engine longitudinal axis. The combustor liner has an array of liner segments arranged about the engine longitudinal axis to define a combustion chamber. Each one of the fuel injector nozzles defines a nozzle axis. A projection of the nozzle axis extends through the combustion chamber. Each one of the liner segments includes an external wall extending axially between leading and trailing edges and extending circumferentially between opposed mate faces with respect to the engine longitudinal axis. A cooling circuit is defined by the external wall. A plurality of heat transfer features are distributed in the cooling circuit to define first and second prioritized flow regions on opposed sides of a first restricted flow region. Each of the first and second prioritized flow regions extend axially along the projection of the nozzle axis of respective ones of the fuel injector nozzles such that a width of the first and second prioritized flow regions progressively increases from the leading edge to the trailing edge.

In a further embodiment of any of the foregoing embodiments, the first restricted flow region is circumferentially spaced from the projection of the nozzle axis of each and every one of the fuel injector nozzles.

In a further embodiment of any of the foregoing embodiments, the first restricted flow region tapers from the leading edge to the trailing edge.

In a further embodiment of any of the foregoing embodiments each of the mate faces defines an intersegment gap with the mate face of an adjacent one of the liner segments. The plurality of heat transfer features are distributed in the cooling circuit to define second and third restricted flow regions that extend substantially along the mate faces to bound a perimeter of respective ones of the first and second prioritized flow regions.

In a further embodiment of any of the foregoing embodiments, the intersegment gap is dimensioned to eject cooling flow into the combustion chamber.

In a further embodiment of any of the foregoing embodiments, the array of liner segments includes a first set of liner segments and a second set of liner segments axially arranged to define a stepwise change in area of the combustion chamber such that each cooling circuit of the first set of liner segments is oriented to eject cooling flow onto external surfaces of the second set of liner segments bounding the combustion chamber.

The various features and advantages of this invention will become apparent to those skilled in the art from the following detailed description of an embodiment. The drawings that accompany the detailed description can be briefly described as follows.

DETAILED DESCRIPTION

Figure 1:
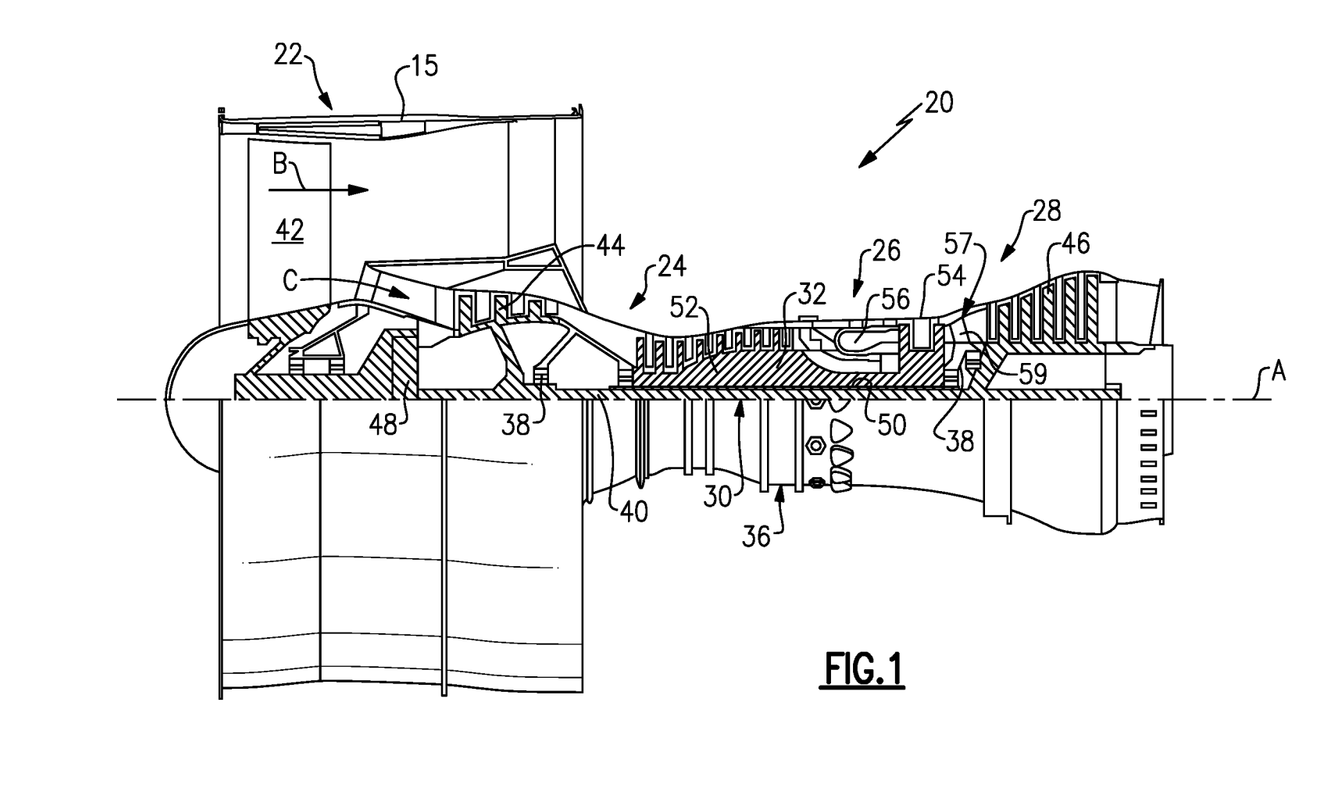
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
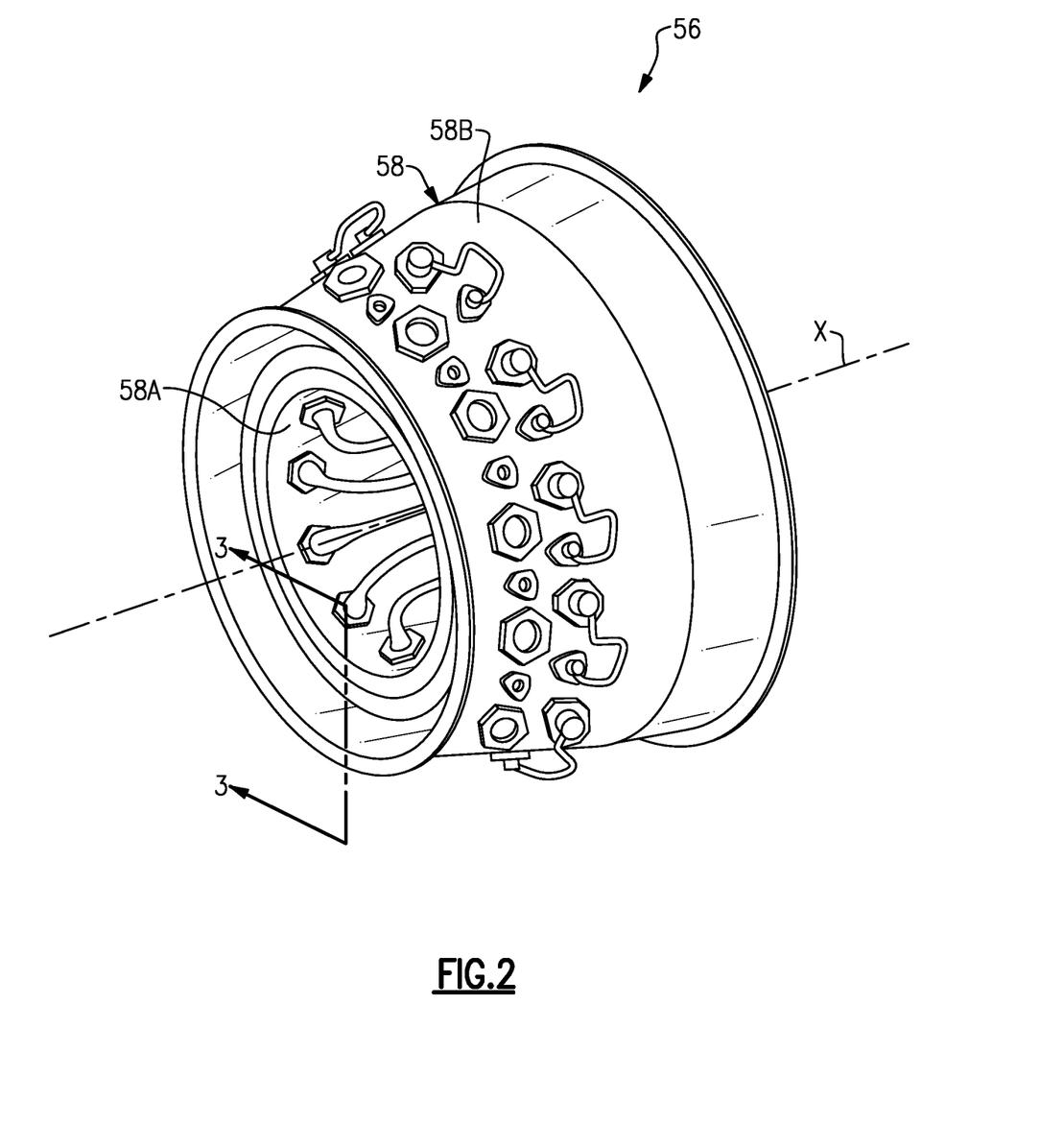
FIG. 2 is a perspective view of a combustor.

Referring to FIG. 2, the combustor 56 includes at least one combustor case 58 that extends along a longitudinal axis X. The longitudinal axis X can be parallel to or collinear with the engine longitudinal axis A of FIG. 1. The combustor case 58 includes an inner (or first) combustor case 58A and an outer (or second) diffuser case 58B that extend about the longitudinal X. Each of the cases 58A, 58B has a generally annular geometry.

Figure 3:
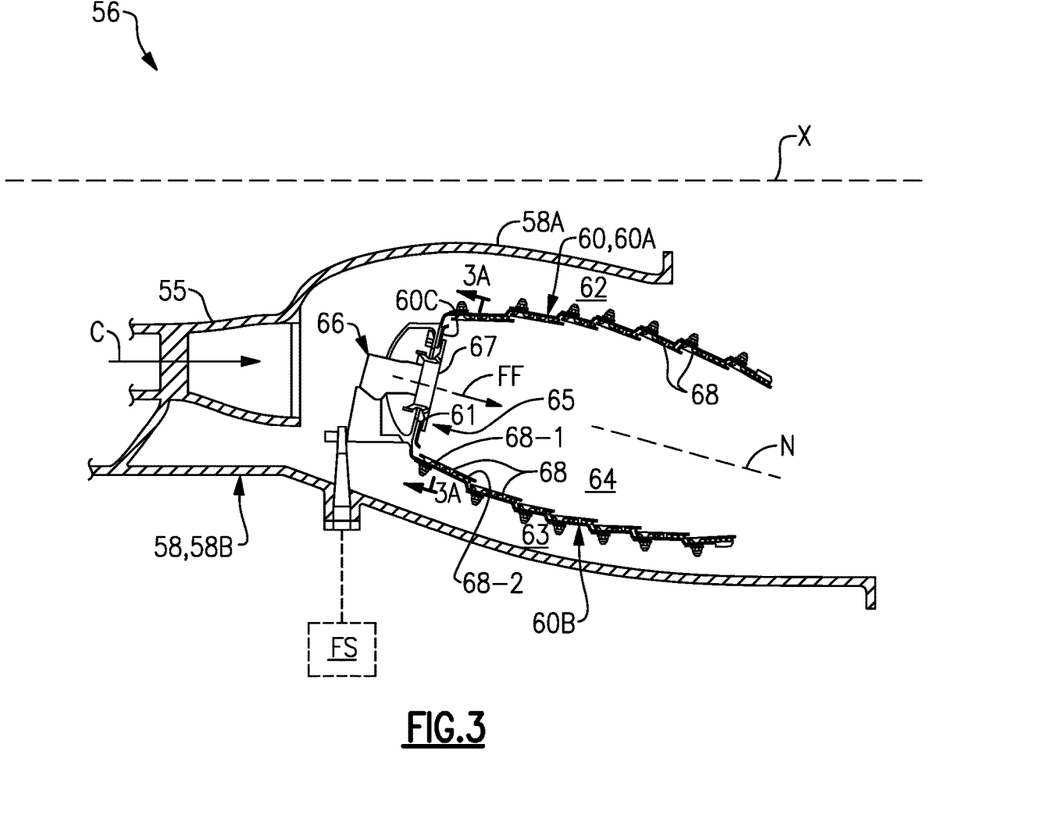
FIG. 3 is a sectional view of the combustor taken along line 3-3 of FIG. 2.

Referring to FIG. 3, with continuing reference to FIG. 2, a divergent nozzle or diffuser 55 is dimensioned to deliver flow in the core flow path C from the compressor section 24 (FIG. 1) to the combustor case 58. The combustor 56 includes a plurality of combustor liners 60 arranged between the cases 58A, 58B. The combustor liners 60 include at least an inner (or first) combustor liner 60A and an outer (or second) combustor liner 60B that are concentric and are arranged to extend about the longitudinal axis X.

The inner combustion liner 60A extends about the inner combustor case 58A to define an inner (or first) plenum 62. The outer diffuser case 58B extends about the outer combustor liner 60B to define an outer (or second) plenum 63. Each of the plenums 62, 63 has a generally annular geometry. The plenums 62, 63 can be arranged to receive flow from the diffusor 55.

Each combustor liner 60 can include one or more liner segments 68. The liner segments 68 have an arcuate geometry and are arranged in an array about the longitudinal axis X to bound or otherwise define an annular combustion chamber 64, as illustrated schematically by FIG. 3A. The liner segments 68 can be made of a high temperature metal or metal alloy, including directionally solidified and single crystal materials, for example.

Figure 3A:
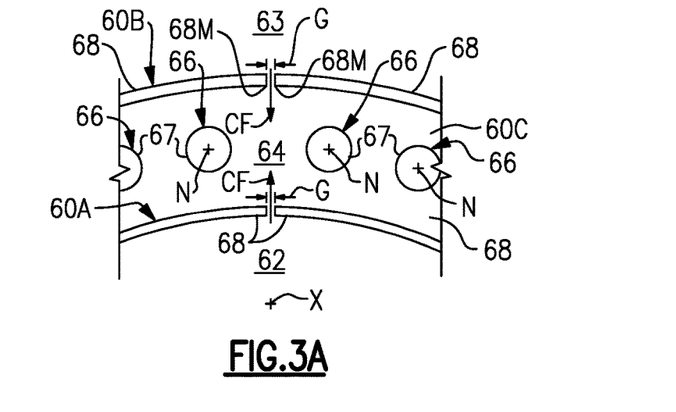
FIG. 3A schematically illustrates the combustor taken along line 3A-3A of FIG. 3.

The combustor 56 includes a bulkhead 60C that bounds the combustion chamber 64 in an axial direction with respect to the longitudinal axis X. The combustor 56 includes an array of fuel injectors 66 arranged about the longitudinal axis X, as illustrated by FIGS. 3 and 3A. Each fuel injector 66 is fluidly coupled to a fuel source FS. The fuel source FS is operable to supply fuel to each fuel injector 66 during engine operation.

Each fuel injector 66 includes a fuel injector nozzle 67 that is operable to eject a quantity of fuel FF along a respective nozzle axis N. A projection of the nozzle axis N extends through the combustion chamber 64. A major component of the nozzle axis N extends in a direction that is parallel to the longitudinal axis X, as illustrated by FIG. 3.

Figure 4:
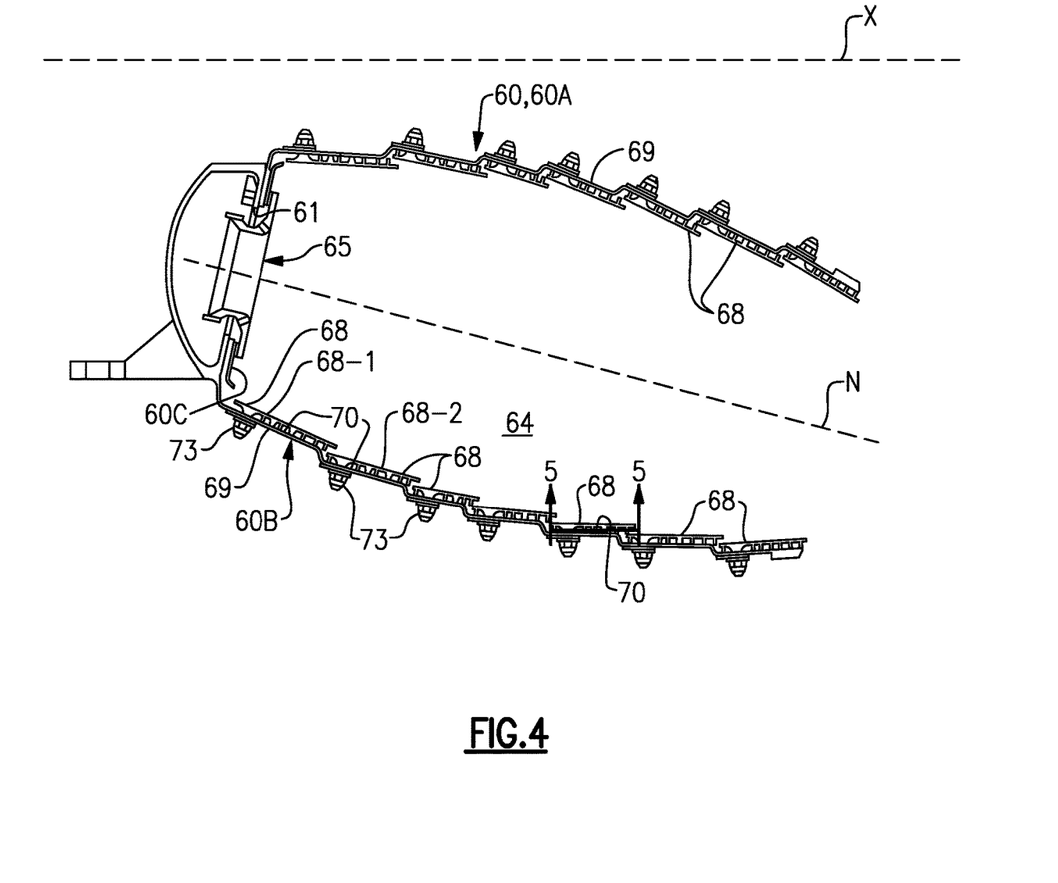
FIG. 4 is a sectional view of the combustor of FIG. 3 with a fuel injector nozzle uninstalled.

Referring to FIG. 4, with continuing reference to FIG. 3, the combustor liners 60 are shown with the fuel injector nozzle 67 of FIG. 3 removed for illustrative purposes. An injector mount 65 is dimensioned to receive a respective one of the nozzles 67 and extends along a respective nozzle axis N. The bulkhead 60C can define one or more apertures 61 (one shown for illustrative purposes) defined along the combustion chamber 64. Each aperture 61 is dimensioned to receive a respective fuel injector nozzle 67, as illustrated by FIG. 3.

Each combustor liner 60A, 60B can include a liner support 69 that extends in the axial direction from the bulkhead 60C. Each liner segment 68 can be mounted or otherwise mechanically attached to the liner support 69 with one or more fasteners 73, for example.

The liner support 69 can have a stepwise geometry, with the liner segments 68 arranged in the axial direction with respect to the longitudinal axis X to define a stepwise change in area of the combustion chamber 64 along the liner support 69. Adjacent liner segments 68 can axially overlap relative to the longitudinal axis X.

Figure 5:
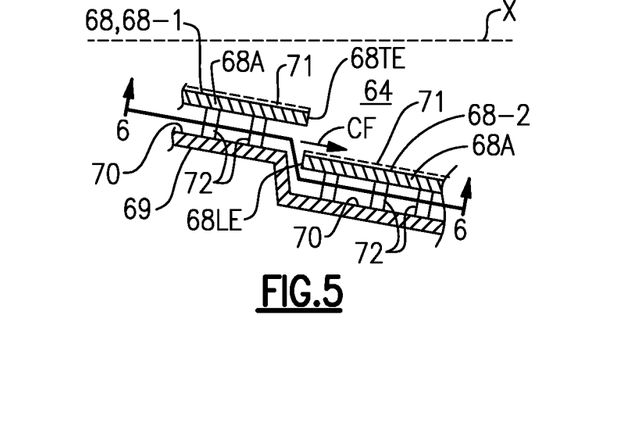
FIG. 5 is a sectional view of adjacent liner segments of the combustor of FIG. 3.

Each liner segment 68 defines a cooling circuit 70 that conveys cooling flow CF to cool portions of the liner segment 68 and adjacent portions of the combustor 56, such as an adjacent (e.g., downstream) liner segment 68. As illustrated by FIGS. 4 and 5, the array of liner segments 68 can be arranged in the axial direction with respect to longitudinal axis X to define a step formation or stepwise change in area of the combustion chamber 64 such that each cooling circuit 70 of an upstream (or first) set of liner segments 68 is oriented to eject cooling flow CF from a respective trailing edge 68TE onto external surfaces of each external wall 68A of a downstream (or second) set of liner segments 68 bounding the combustion chamber 64, as illustrated by liner segments 68-1, 68-2.

Figure 6:
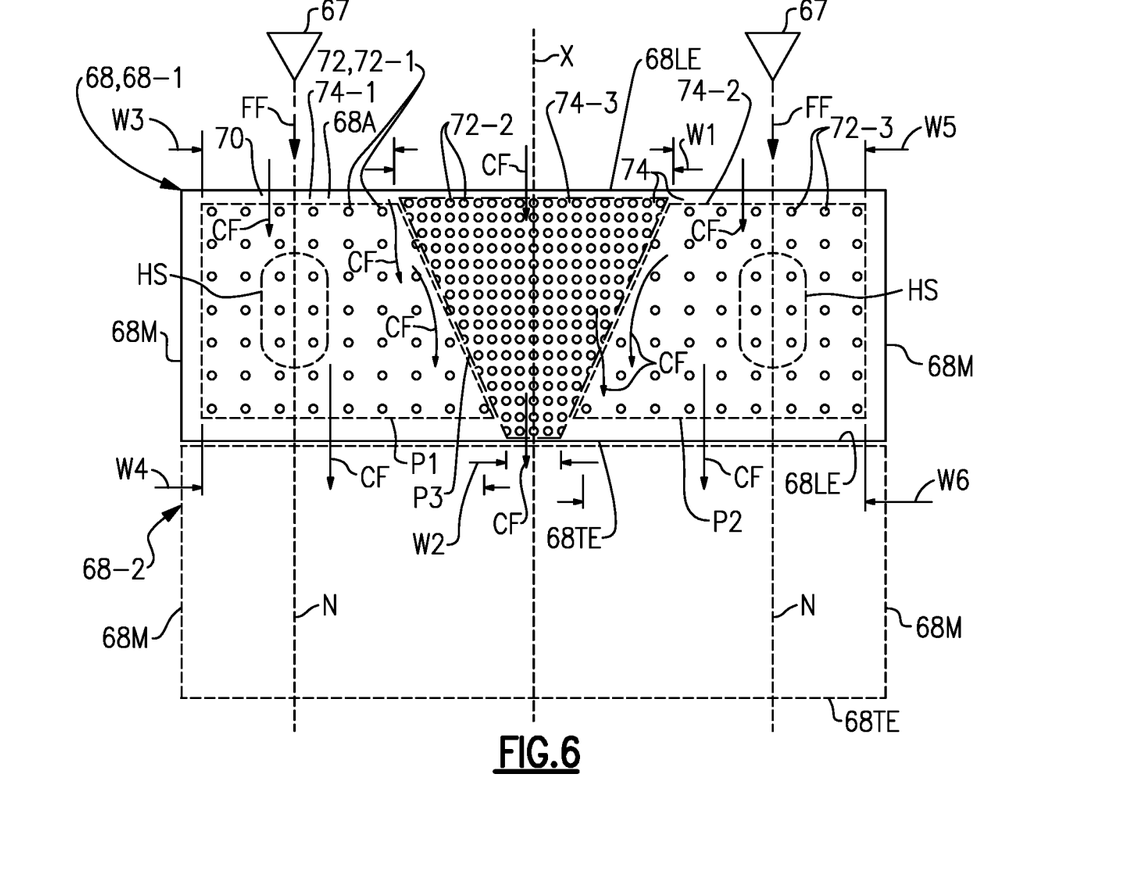
FIG. 6 is a sectional view of the liner segments taken along line 6-6 of FIG. 5.

FIG. 6 illustrates a sectional view of one of the liner segments 68 defining a respective cooling circuit 70. The external wall 68A of the liner segment 68 is dimensioned to bound the combustion chamber 64. The external wall 68A extends between leading and trailing edges 68LE, 68TE in the axial direction and extends between opposing mate faces 68M in a circumferential direction with respect to the longitudinal axis X. Each of the liner segments 68 can have a substantially rectangular cross-sectional geometry.

In examples, the external wall 68A is a portion of one of the inner and/or outer combustor liners 60A, 60B or bulkhead 60C (FIGS. 3 and 4). For example, the liner segment 68 can be one of the liner segments 68 of the inner combustion liner 60A. In the illustrative example of FIG. 6, the liner segment 68 is the upstream liner segment 68-1 of outer combustion liner 60B positioned axially forward of axially aft liner segment 68-2 (shown in dashed lines for illustrative purposes). Liner segment 68-1 can be situated in a first, axially forwardmost row of the liner segments 68 relative to the fuel injector nozzles 67 and bulkhead 60C, as illustrated by FIGS. 3 and 4, or can be situated in another one of the rows of liner segments 68 such as the second row of liner segments 68-2. Although the cooling circuits disclosed herein primarily refer to a combustor, other gas turbine engine components such as walls of the core flow path C in the turbine section 28 or mid-turbine frame 57 and other systems requiring cooling augmentation can benefit from the teachings disclosed herein.

The cooling circuit 70 is defined by surfaces of the external wall 68A. In the illustrated example of FIG. 5, the combustion chamber 64 and the cooling circuit 70 are on opposed sides of the external wall 68A. In some examples, a thermal barrier coating 71 is disposed on surfaces of the external wall 68A (shown in dashed lines in FIG. 5 for illustrated purposes). In the illustrative example of FIGS. 5 and 6, surfaces of the external wall 68A defining the combustion chamber 64 are substantially free of any cooling apertures along the cooling circuit 70.

The liner segment 68 is circumferentially aligned with the nozzle axes N of two fuel injector nozzles 67. The projections of the nozzle axes N can be relatively closer to the mate faces 68M than arrangements having a liner segment circumferentially aligned with the nozzle axis of only one fuel injector nozzle, which may cause relatively greater thermal gradients to form across the liner segment 68 and non-uniform distribution of heat. The thermal gradients may cause the liner segment 68 to expand and distort during engine operation. The cooling circuits disclosed herein can be arranged to reduce the formation of thermal gradients across the liner segments.

Liner segment 68 includes a plurality of heat transfer features 72 extending from the external wall 68A. The heat transfer features 72 are distributed in the cooling circuit 70 to interact with cooling flow CF for providing convective cooling to adjacent portions of the liner segment 68. The heat transfer features 72 extend in a radial direction with respect to the longitudinal axis X at least partially between opposed internal surfaces of the external wall 68A and liner support 69 that define the cooling circuit 70. In the illustrative example of FIG. 5, heat transfer features 72 include pin-fins or pedestals that extend in the radial direction between the opposed internal surfaces of the external wall 68A and liner support 69 that define the cooling circuit 70. Each of the pedestals can have an elliptical geometry, as illustrated by FIG. 6. However, other geometries can be utilized such as rectangular, cube, diamond, oblong, teardrop, triangular or racetrack shaped cross-sectional geometries. One would understand how to dimension the heat transfer features 72 utilizing the teachings disclosed herein.

Figure 7:
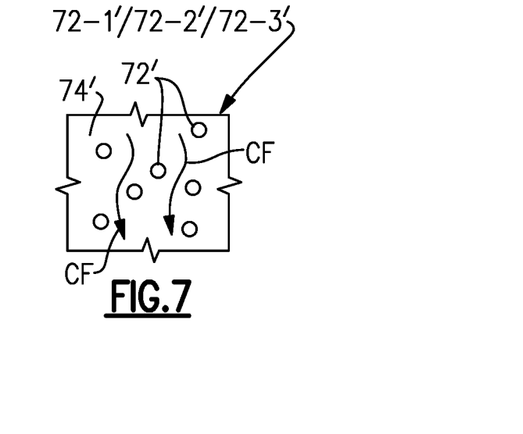
FIG. 7 illustrates an example distribution of heat transfer features.

The heat transfer features 72 are arranged in contiguous sets 72-1 through 72-3. Each of the respective sets 72-1 through 72-3 of heat transfer features 72 can be uniformly distributed, as illustrated by FIG. 6. In other examples, at least some of the heat transfer features 72' in the respective sets 72-1', 72-2' and/or 72-3' are non-uniformly distributed, as illustrated by FIG. 7.

Each of the sets of heat transfer features 72-1, 72-2, 72-3 can be arranged relative to non-uniform boundary conditions such as heat concentrations or localized hotspots HS (shown in dashed lines in FIG. 6 for illustrative purposes) that can form along the liner segment 68 during engine operation. For example, formation of localized hot spots HS can occur due to ignition of fuel FF ejected by the nozzles 67. The hot spots HS can be generated or otherwise formed along the respective nozzle axes N. The hot spots HS typically have a relatively greater temperature than other portions of the liner segment 68 in operation, and in some scenarios can establish a peak temperature gradient relative to the liner segment 68. The distribution of heat transfer features 72 can reduce a likelihood of degradation of the liner segment 68 adjacent the hot spots HS that may otherwise occur due to excessive temperature exposure and insufficient cooling augmentation.

The sets of heat transfer features 72-1 to 72-3 are distributed in the cooling circuit 70 to define at least one prioritized flow region and at least one restricted flow region to prioritize distribution of cooling flow CF in the cooling circuit 70. In the illustrated example of FIG. 6, the cooling circuit 70 includes first and second prioritized flow regions 74-1, 74-2 that extend along and are defined on opposed sides of a first restricted flow region 74-3.

The flow regions 74 can be dimensioned with respect to the location of each of the nozzle axes N. For example, the heat transfer features 72 are arranged such that the prioritized flow regions 74-1, 74-2 extend along the projection of a respective one of the nozzle axes N, and the restricted flow region 74-3 is circumferentially spaced from the projection of each and every one of the nozzle axes N with respect to the longitudinal axis X.

A concentration of heat transfer features 72 in each flow region 74 can be defined with respect to a volume of the cooling circuit 70 per unit area, which can be set by the shape, spacing, size and/or orientation of the heat transfer features 72. Each of the prioritized flow regions 74-1, 74-2 has a relatively lesser concentration of the heat transfer features 72 than the restricted flow region 74-3. An average concentration of heat transfer features 72 in the restricted flow region 74-3 differs in the circumferential direction from the prioritized flow regions 74-1, 74-2 for at least a majority of axial positions relative to the longitudinal axis X.

In the illustrative example of FIG. 6, the heat transfer features 72-3 in the restricted flow region 74-3 are more densely spaced than the heat transfer features 72-1, 72-2 in the prioritized flow regions 74-1, 74-2. The relative concentrations of the heat transfer features 72-1, 72-2, 72-3 can increase the amount of convective cooling to portions of the liner segment 68 adjacent the localized hot spots HS, even though the concentration of heat transfer features 72-1, 72-2 in the prioritized flow regions 74-1, 74-2 is less than the concentration of heat transfer features 72-3 in the restricted flow region 74-3.

The sets of heat transfer features 72-1, 72-2, 72-3 establish respective perimeters P1, P2, P3 (shown in dashed lines) of the prioritized and restricted flow regions 74-1, 74-2, 74-3. The prioritized flow regions 74-1, 74-2 extend substantially from the leading edge 68LE to the trailing edge 68TE such that the perimeters P1, P2 are bounded by the perimeter P3 of the restricted flow region 74-3. The perimeters P1, P2 of the prioritized flow regions 74-1, 74-2 extend substantially along a respective one of the mate faces 68M. For the purposes of this disclosure, the term "substantially" means that the respective perimeter P1/P2/P3 is defined within an average distance of the respective heat transfer features 72-1/72-2/72-3 from the referenced component, such as the leading edge 68LE, mate faces 68M and/or trailing edge 68TE.

The heat transfer features 72 can be dimensioned and arranged such that each of the prioritized flow regions 74-1, 74-2 has a relatively greater average flow path volume than the restricted flow region 74-3. The average flow path volume can be defined as a volume of the cooling circuit 70 within the respective perimeter P1, P2, P3 per unit area.

In examples, each of the prioritized flow regions 74-1, 74-2 comprises at least 25% of a total flow path volume of the cooling circuit 70 in the liner segment 68, or more narrowly between 30% and 40% of the total flow path volume, with the restricted flow region 74-3 comprising a remainder of the total flow path volume. In examples, the prioritized flow regions 74-1, 74-2 have at least a quantity of three or four heat transfer features 72 per square inch for at least a majority of the cross sectional area of the respective prioritized flow regions 74-1, 74-2.

The flow regions 74 can be dimensioned relative to the localized hot spots HS. In the illustrative example of FIG. 6, the perimeter P3 of the restricted flow region 74-3 has a substantially trapezoidal (e.g., isosceles) geometry, with a width of the restricted flow region 74-3 generally increasing from the leading edge 68LE to the trailing edge 68TE. A first width W1 of the restricted flow region 74-3 adjacent the leading edge 68LE is greater than a second width W2 of the restricted flow region 74-3 adjacent the trailing edge 68TE such that at least a majority of the restricted flow region 74-3 progressively decreases in width or tapers from the leading edge 68LE to the trailing edge 68TE. The prioritized flow regions 74-1, 74-2 are axially aligned with the restricted flow region 74-3 for at least a majority, or more than 75% or 90%, of a length of the liner segment 68 between the leading and trailing edges 68LE, 68TE.

The perimeters P1, P2 of the prioritized flow region 74-1, 74-2 extend between the axially forwardmost and axially aftmost heat transfer features 72 that are along or otherwise near the respective nozzle axes N. A width of each of the prioritized flow regions 74-1, 74-2 can generally increase from the leading to trailing edges 68LE, 68TE. In the illustrated example of FIG. 6, a third width W3 of the first prioritized flow region 74-1 adjacent the leading edge 68LE is less than a fourth width W4 of the first prioritized flow region 74-1 adjacent the trailing edge 68TE. A fifth width W5 of the second prioritized flow region 74-2 adjacent the leading edge 68LE is less than a sixth width W6 of the second prioritized flow region 74-2 adjacent the trailing edge 68TE. Widths of the respective prioritized flow regions 74-1, 74-2 defining the perimeters P1, P2 can progressively increase from the leading edge 68LE to the trailing edge 68TE for at least a majority of the prioritized flow regions 74-1, 74-2.

The difference in widths of the flow regions 74 relative to the leading and trailing edges 68LE, 68TE can increase diffusion of cooling flow CF ejected from the trailing edge 68TE toward an adjacent, downstream liner segment 68-2 (shown in dashed lines for illustrated purposes). The heat transfer features 72 can be distributed such that the cooling flow CF ejected along the trailing edge 68TE is diffused and substantially uniform in the circumferential direction when presented to the leading edge 68LE of the downstream liner segment 68-2, which can reduce a likelihood of formation of hot spots along the downstream liner segment 68-2.

During operation, cooling flow CF is communicated to each of the flow regions 74. The cooling flow CF can be communicated at substantially the same temperature and/or pressure to each of the flow regions 74 adjacent to the leading edge 68LE, which serves as an inlet to the cooling circuit 70. The cooling flow CF circulates across the heat transfer features 72 to provide convective cooling to adjacent portions of the external wall 68A.

The relative concentrations of the heat transfer features 72 in the flow regions 74 can cause at least a portion of the cooling flow CF in the restricted flow region 74-3 to be diverted or otherwise communicated from the restricted flow region 74-3 to an adjacent one of the prioritized flow regions 74-1, 74-2 due to pressure gradient(s) established by the distribution of the heat transfer features 72-1, 72-2, 72-3, with the prioritized flow regions 74-1, 74-2 operating at relatively lower pressures. The distribution of heat transfer features 72-3 establishes adverse pressure gradient(s) between the restricted flow region 74-3 and prioritized flow regions 74-1, 74-2, which opposes movement of the cooling flow CF from the prioritized flow regions 74-1, 74-2 into the restricted flow region 74-3. At least some of the cooling flow CF can circulate through the restricted flow region 74-3 and is then ejected from the restricted flow region 74-3 at the trailing edge 68TE. The concentration of heat transfer features 72 in each of the flow regions 74 promotes communication of relatively more cooling flow CF in the cooling circuit 70 along the nozzle axes N and toward the hot spot(s) HS, which can reduce a thermal gradient across the liner segment 68 and improve durability of the combustor liner 60 (FIGS. 3 and 4).

Figure 8:
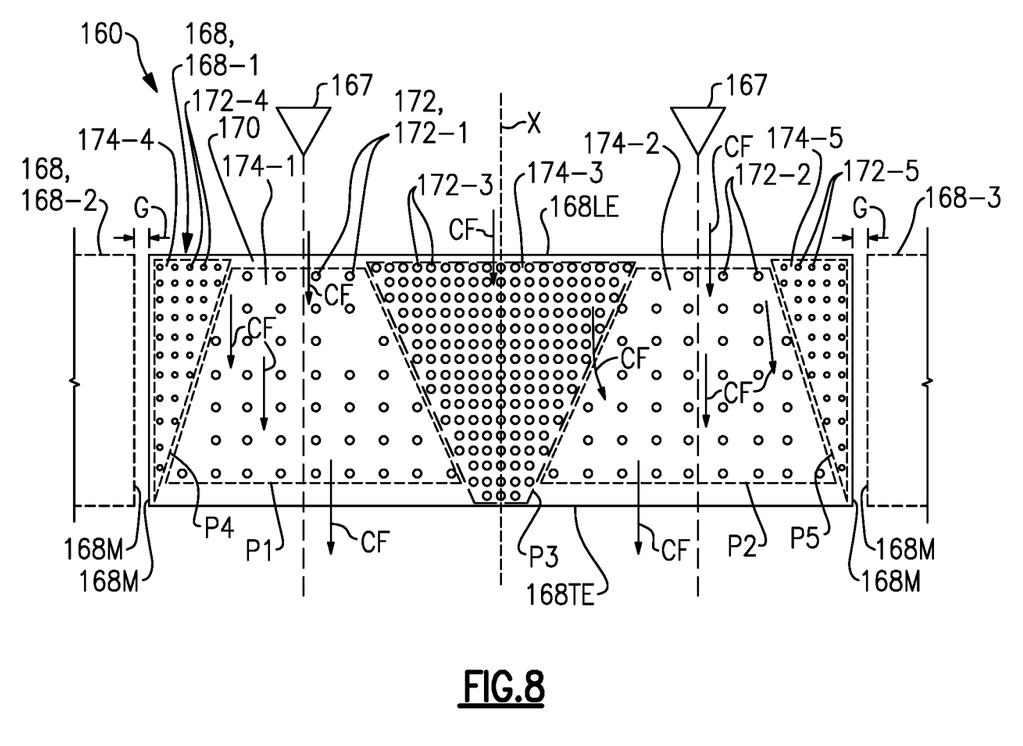
FIG. 8 is a sectional view of a liner segment according to another example.

FIG. 8 illustrates a combustor liner 160 according to another example. In this disclosure, like reference numerals designate like elements where appropriate and reference numerals with the addition of one-hundred or multiples thereof designate modified elements that are understood to incorporate the same features and benefits of the corresponding original elements. The combustor liner 160 includes a plurality of liner segments 168 including liner segment 168-1 arranged circumferentially adjacent to liner segments 168-2, 168-3 (shown in dashed lines for illustrated purposes). Liner segment 168-1 defines a cooling circuit 170 including first and second prioritized flow regions 174-1, 174-2 that extend along opposed sides of restricted flow region 174-3.

Each mate face 168M of the liner segment 168-1 is arranged to define an intersegment gap G with the mate faces 168M of adjacent liner segments 168-2, 168-3. As illustrated by FIG. 3A, each intersegment gap G can be dimensioned to eject cooling flow CF radially inwardly or outwardly from the intersegment gap G into the combustor chamber 64 to provide cooling augmentation to portions of the liner segments 68 adjacent the mate faces 68M.

Heat transfer features 172 are distributed in the cooling circuit 170 to define second and third restricted flow regions 174-4, 174-5 including respective sets of the heat transfer features 172-4, 172-5. Each of the second and third restricted flow regions 174-4, 174-5 extends along a respective one of the mate faces 168M and bounds a perimeter of a respective one of the prioritized flow regions 174-1, 174-2. Each of the perimeters P1, P2 of the prioritized flow regions 174-1, 174-2 has a substantially trapezoidal geometry, with a width of the prioritized flow regions 174-1, 174-2 generally increasing from leading edge 168LE to trailing edge 168TE. Perimeter P3 of the restricted flow region 174-3 has a substantially trapezoidal geometry. Perimeters P4, P5 of the restricted flow regions 174-4, 174-5 each have a substantially triangular geometry. A width of each of the restricted flow regions 174-4, 174-5 can be set (e.g., increased or decreased) to vary the amount of cooling flow CF communicated adjacent the mate faces 168M.

Each of the second and third restricted flow regions 174-4, 174-5 has a relatively greater concentration of the heat transfer features 172 than an adjacent one of the prioritized flow regions 174-1, 174-2. The prioritized flow regions 174-1, 174-2 have a relatively greater average flow path volume than the restricted flow regions 174-3, 174-4, 174-5. The heat transfer features 172-4, 172-5 in the restricted flow regions 174-4, 174-5 can oppose or otherwise reduce the amount of cooling flow CF that is communicated from the prioritized flow regions 174-1, 174-2 toward the intersegment gaps G, which can reduce efficiency losses that may be otherwise caused by overcooling portions of the liner segments 168 adjacent to the mate faces 168M. The distribution of heat transfer features 172-4, 172-5 can be the same or can differ from the distribution of heat transfer features 172-3, including shape, spacing and/or orientation. In the illustrated example of FIG. 8, an average size of the heat transfer features 172-4, 172-5 is less than an average size of the heat transfer features 172-3, and an average spacing between the heat transfer features 172-4, 172-5 is greater than an average spacing between the heat transfer features 172-3.

Figure 9:
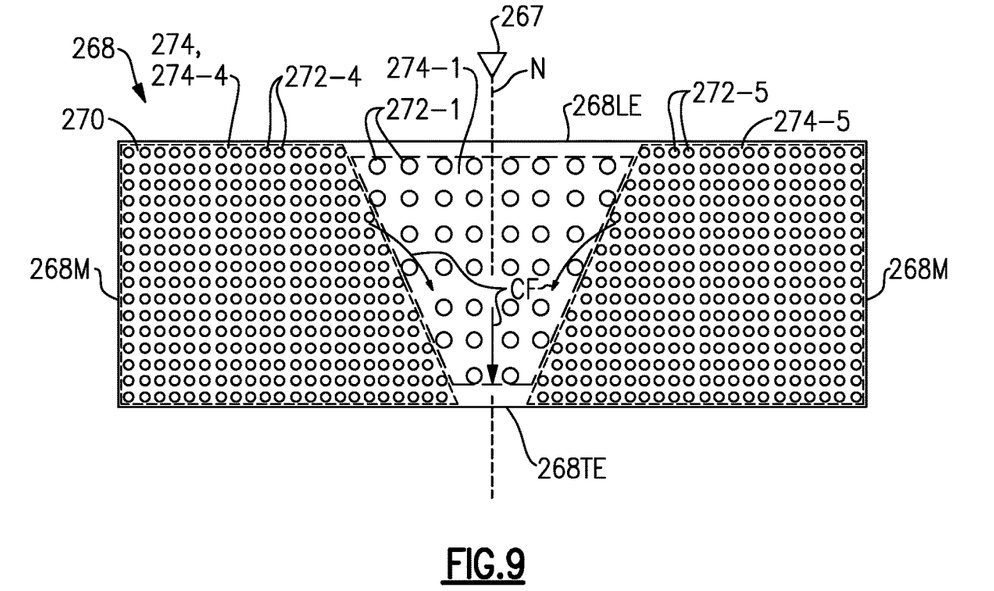
FIG. 9 is a sectional view of a liner segment arranged relative to a fuel injector nozzle according to yet another example.
Figure 10:
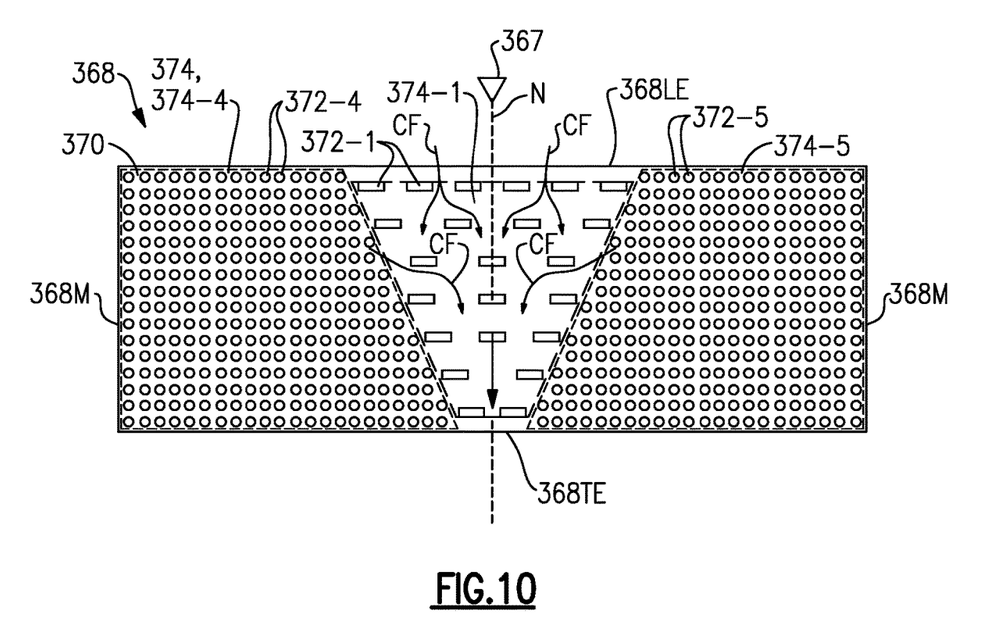
FIG. 10 is a sectional view of a liner segment arranged relative to a fuel injector nozzle according to yet another example.

FIG. 9 illustrates a liner segment 268 defining a cooling circuit 270 according to yet another example. Heat transfer features 272-1, 272-4, 272-5 are arranged to define restricted flow regions 274-4, 274-5 that extend along mate faces 268M and along opposed sides of prioritized flow region 274-1. Heat transfer features 272-1 have a relatively greater diameter and are less densely spaced than heat transfer features 274-4, 274-5 such that the prioritized flow region 274-1 has a relatively greater average flow path volume than the restricted flow regions 274-4, 274-5 to promote flow of cooling flow CF toward and along a projection of nozzle axis N. In the illustrated example of FIG. 10, heat transfer features 372-1 have a substantially rectangular geometry, with a major component of a length of the heat transfer features 372-1 oriented in a circumferential direction with respect to a respective nozzle axis N and/or longitudinal axis X to oppose cooling flow CF.

Figure 11:
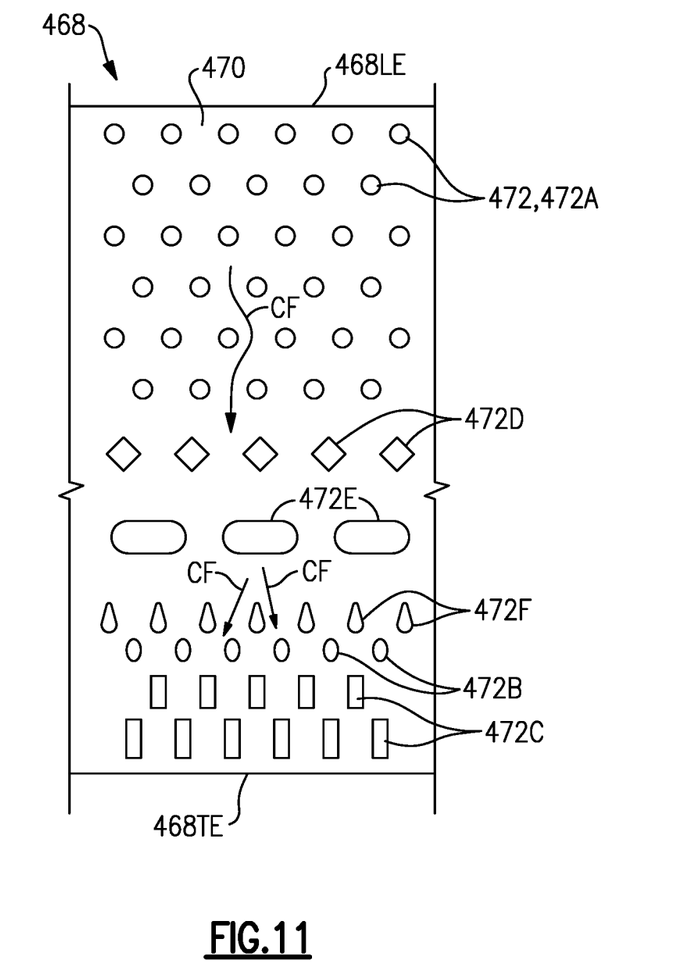
FIG. 11 illustrates example geometries of heat transfer features.

FIG. 11 illustrates example geometries of heat transfer features 472 that can be utilized in any of the cooling circuits disclosed herein. Heat transfer features 472A have a substantially cylindrical cross-sectional geometry. Heat transfer features 472B have an elliptical, non-circular geometry. Heat transfer features 472C have an elongated, substantially rectangular geometry. Heat transfer features 472D have a diamond shaped geometry. Heat transfer features 472E have a race track shaped geometry. Heat transfer features 472F have a teardrop shaped geometry. The arrangement of heat transfer features 472B, 472C can improve diffusion of cooling flow CF outwardly from trailing edge 468TE of liner segment 468 and reduce distress by orienting the cooling flow CF toward a localized hot spot of a downstream liner segment.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A combustor section for a gas turbine engine comprising:
   an array of fuel injector nozzles arranged about a longitudinal axis;
   a combustor liner including an array of liner segments arranged about the longitudinal axis to define a combustion chamber;
   wherein each one of the fuel injector nozzles defines a nozzle axis, a projection of the nozzle axis extending through the combustion chamber;
   wherein each one of the liner segments comprises:
      an external wall extending axially between leading and trailing edges and extending circumferentially between opposed mate faces with respect to the longitudinal axis;
      wherein a cooling circuit is defined by the external wall; and
      wherein a plurality of heat transfer features are distributed in the cooling circuit to define first and second prioritized flow regions on opposed sides of a first restricted flow region, each of the first and second prioritized flow regions extending axially along the projection of the nozzle axis of respective ones of the fuel injector nozzles from the leading edge to the trailing edge such that the first restricted flow region tapers from the leading edge to the trailing edge, and each of the first and second prioritized flow regions having a relatively greater average flow path volume than the first restricted flow region.

2. The combustor section as recited in claim 1, wherein each of the mate faces defines an intersegment gap with the mate face of an adjacent one of the liner segments.

3. The combustor section as recited in claim 2, wherein the first and second prioritized flow regions extend along the respective mate faces.

4. The combustor section as recited in claim 1, wherein the plurality of heat transfer features are distributed in the cooling circuit to define second and third restricted flow regions that extend substantially along the mate faces to bound a perimeter of respective ones of the first and second prioritized flow regions, and each of the first and second prioritized flow regions has a relatively greater average flow path volume than the second and third restricted flow regions.

5. The combustor liner as recited in claim 1, wherein the at least one liner segment includes a first liner segment and a second liner segment arranged in the axial direction to define a stepwise change in an area of the combustion chamber such that the cooling circuit of the first liner segment is oriented to eject cooling flow from the trailing edge of the first liner segment onto external surfaces of the external wall of the second liner segment that defines the combustion chamber.

6. The combustor section as recited in claim 4, wherein each of the second and third restricted flow regions has a lesser concentration of the heat transfer features than the first restricted flow region.

7. The combustor section as recited in claim 4, wherein each of the second and third restricted flow regions tapers from the leading edge to the trailing edge.

8. The combustor section as recited in claim 1, wherein surfaces of the external wall defining the combustion chamber are substantially free of any cooling apertures along the cooling circuit.

9. The combustor section as recited in claim 1, wherein the array of liner segments include a first liner segment and a second liner segment arranged in an axial direction relative to the longitudinal axis to define a stepwise change in area of the combustion chamber such that the cooling circuit of the first liner segment is oriented to eject cooling flow from the trailing edge of the first liner segment onto external surfaces of the external wall of the second liner segment that bound the combustion chamber.

10. The combustor liner as recited in claim 9, wherein the surfaces of the external wall defining the combustion chamber are free of any cooling apertures along the cooling circuit.

11. The combustor section as recited in claim 10, wherein the plurality of pedestals include sets of pedestals arranged in rows to establish the first restricted flow region.

* * * * *